US012808582B2

(12) United States Patent
Normann et al.

(10) Patent No.: US 12,808,582 B2
(45) Date of Patent: Nov. 24, 2026

(54) EXPLOITING GEOTHERMAL ENERGY THROUGH HEAT RECOVERY BY CIRCULATING WORKING FLUID IN PURPOSE-BUILT SYSTEM OF MULTILATERAL WELLS

(71) Applicant: Halliburton Energy Services, Inc., Houston, TX (US)

(72) Inventors: Eyvind Normann, Sandnes (NO); Jan Edin Evensen, Oslo (NO)

(73) Assignee: Halliburton Energy Services, Inc., Houston, TX (US)

( * ) Notice: Subject to any disclaimer, the term of this patent is extended or adjusted under 35 U.S.C. 154(b) by 406 days.

(21) Appl. No.: 17/789,247

(22) PCT Filed: Jan. 6, 2021

(86) PCT No.: PCT/NO2021/050002

§ 371 (c)(1),
(2) Date: Jun. 27, 2022

(87) PCT Pub. No.: WO2021/145776

PCT Pub. Date: Jul. 22, 2021

(65) Prior Publication Data

US 2023/0045716 A1 Feb. 9, 2023

(30) Foreign Application Priority Data

Jan. 17, 2020 (NO) .................................... 20200066

(51) Int. Cl.
*F24T 10/20* (2018.01)
*E21B 43/14* (2006.01)
*F24T 10/00* (2018.01)

(52) U.S. Cl.
CPC .............. *F24T 10/20* (2018.05); *E21B 43/14* (2013.01); *F24T 2010/50* (2018.05); *Y02E 10/10* (2013.01)

(58) Field of Classification Search
CPC Y02E 10/10; F24T 10/10; F24T 10/20; F24T 2010/50; E21B 43/305; E21B 43/14
See application file for complete search history.

(56) References Cited

U.S. PATENT DOCUMENTS

2011/0067399 A1* 3/2011 Rogers ...................... F03G 7/04 60/641.2
2015/0013981 A1* 1/2015 Shimko .................. E21B 7/061 166/298

(Continued)

FOREIGN PATENT DOCUMENTS

CA 3008878 A1 * 12/2018 ............. C09K 8/592
CN 2679905 3/2011

(Continued)

OTHER PUBLICATIONS

CN-106285475-A, English Language Machine Translation (Year: 2017).*

(Continued)

*Primary Examiner* — Wesley G Harris
(74) *Attorney, Agent, or Firm* — Scott Richardson; Parker Justiss, P.C.

(57) ABSTRACT

The present invention relates to heat extraction from a hot dry rock system using a single well with multilaterals in a closed loop circulation. More particularly, it relates to geothermal heat collector systems. A working fluid is circulated through a single well (106) with several lateral heat absorbing branches (113). These branches are sidetracked off the main wellbore (111) and completed using a slotted lateral sealed bore junction and hanger assembly completion (114) installed in the main wellbore (111). The lateral heat absorb- (Continued)

ing branches (113) are tied in and completed in a tubing mono assembly, comprising of the well (106) and lateral heat absorbing branches (113). The tubing assembly is hung off in a slotted tubing hanger assembly (112) that is installed in the bottom section of the main wellbore (111). The hanger assemblies are equipped with circulation ports and open hole rock slips. The heat extraction is done through direct contact between the working fluid and the formation.

13 Claims, 2 Drawing Sheets

(56) References Cited

U.S. PATENT DOCUMENTS

| | | | | |
|---|---|---|---|---|
| 2016/0245550 | A1 * | 8/2016 | Sønju | F24T 10/10 |
| 2017/0107805 | A1 * | 4/2017 | Dallas | E21B 43/305 |
| 2020/0011151 | A1 * | 1/2020 | Toews | E21B 43/305 |

FOREIGN PATENT DOCUMENTS

| | | | | | |
|---|---|---|---|---|---|
| CN | 105064981 | | | 11/2015 | |
| CN | 105909214 | A | | 8/2016 | |
| CN | 106285475 | | | 1/2017 | |
| CN | 106285475 | A | * | 1/2017 | |
| CN | 108224820 | A | * | 6/2018 | |
| CN | 108489124 | A | * | 9/2018 | |
| CN | 109236186 | A | * | 1/2019 | E21B 23/01 |
| CN | 109798091 | | | 5/2019 | |
| CN | 109798091 | A | * | 5/2019 | |
| CN | 109798683 | A | * | 5/2019 | |
| CN | 110360761 | | | 10/2019 | |
| CN | 110360761 | A | * | 10/2019 | |
| CN | 209783025 | U | * | 12/2019 | |
| CN | 110863800 | A | * | 3/2020 | |
| CN | 111237146 | A | * | 6/2020 | F03G 7/04 |
| GB | 2463187 | A | * | 3/2010 | E21B 34/10 |
| WO | WO-2011034547 | A1 | * | 3/2011 | E21B 41/0035 |
| WO | WO-2012023881 | A1 | * | 2/2012 | E21B 43/305 |
| WO | WO-2013169242 | A1 | * | 11/2013 | E21B 43/25 |

OTHER PUBLICATIONS

International Search Report Issued in PCT/NO2021/050002, Mar. 23, 2021, pp. 1-3.

Written Opinion Issued in PCT/NO2021/050002, Mar. 23, 2021, pp. 1-4.

* cited by examiner

EXPLOITING GEOTHERMAL ENERGY THROUGH HEAT RECOVERY BY CIRCULATING WORKING FLUID IN PURPOSE-BUILT SYSTEM OF MULTILATERAL WELLS

FIELD OF INVENTION

The present invention relates to heat extraction from hot dry rock system using a single well with multilaterals in a closed loop circulation. More particularly, it relates to geothermal heat collector systems.

BACKGROUND

Geothermal energy belongs to a clean and renewable energy, it is generated from nuclear fission in the earth's interior and transmitted as heat by conduction to earth's outer crust. This energy is renewable because there is a constant heat flow from the earth's interior toward the outer crust. Despite its vast potential, only a small amount of the geothermal energy stored deep in the earth has been exploited and this is mainly due some limiting factors like permeability and heat conductivity of the porous rock.

There are three different types of geothermal sources:

Hydrothermal sources that contain water at high pressure and temperature stored in a permeable rock deep in the earth near a heat source.

Hot dry rock sources formed by layers of rock consisting primarily of dense metamorphic rock or granite with low permeability and high temperature.

Magma resources that generate energy by heating groundwater, when this water reaches high temperature and pressure it may erupt and find its way to the surface as a hot spring or geyser.

The present invention relates to the second type, the hot dry rock type. This type has very low permeability and thermal conductivity making heat exchange with a circulating fluid more challenging. The traditional way for extracting heat from underground formations is by what is called Enhanced Geothermal Systems (EGS), which consists in applying hydraulic fracturing to increase the permeability of the rock and the surface area which will be in contact with the injected cold water. At least two wells are needed one for injection of a cold fluid and the other for production of the hot fluid. The heat is extracted in a closed loop, cold fluid is injected into an injection well, crosses the fractured area, collects heat from the rock by heat transfer and return to the surface through a production well. At the surface the heat is extracted from the hot fluid in a heat exchanger, and water is reinjected into the injection well.

This method has several disadvantages:

Hydraulic fracturing operations are sources of a lot of controversy due to their possible health and environmental impacts. Concerns include underground water supply contamination by excessive injection of seawater in the fracturing operation and the generation of seismic waves.

Fluid water crossing the fractured region of the hot rock between wells may have an unpredictable trajectory and may be lost in the fractured region of the formation without reaching the production well short circuiting and disrupting in this way the flow.

The overall cost of a hydraulic fracturing project is high.

The direct contact of the injected water with the formation when crossing the fractured region may produce scaling and corrosion which may damage pipes and surface equipment.

The present invention aims at circumventing the above drawbacks of Enhanced Geothermal Systems using a plant for injecting and circulation of working fluid via a single main well, through an identified geological formation, with adequate thermal gradient below the earth surface. The plant comprises of a surface wellhead 105 a well 106, where the main wellbore 111 is leading from the surface to said formation, including lateral heat absorbing branches 113 branching off the main wellbore in the deeper section of the plant. The upper part of the wellbore 111 is cased off by a surface casing 108 to prevent inflow of external formation water from upper, permeable zones into return annulus 110.

The injection of working fluid from surface will ensure transportation of heated working fluid from the lower, open hole (uncased) formation back to the surface via the return annulus 110 between the injection tubing 109 and the main wellbore 111, and to a heat absorbing arrangement 101, 102, 103 connection between the circulating/injection pump 104 and surface fluids return returns from well 107. The said arrangement comprises a heat exchanger 103 where heat is transferred from said working fluid to a separate working fluid system 101, 102 for heat utilization.

From experience over the last few years, the present inventors have learned that if a geothermal plant of the HDR type is to be constructed, the magnitude of the heat transfer surface contact area is not a critical factor. However, the deciding factor is the availability of a large volume of rock where the circulating wellbore is installed.

For a better understanding of the invention and the construction of the plant, please refer to the attached two schematics embodying the various parts.

STATE OF THE ART

Relevant state of the art HDR patents:

1. CN109798091 Song Xianzhi; Wang Gaosheng et al. Relates to energy extraction from a hot dry rock using a single well with multi-laterals in a closed loop circulation. a vertical well-bore is drilled cased and cemented, lateral well-bores sidetracked off the main vertical well at a predetermined depth are cased and cemented. Vacuum insulation tubes are inserted into each of the lateral well-bores and a second vacuum insulation tube is inserted into the vertical well-bore, the lateral tubes are connected to the main vertical tube through a conversion joint. The vertical tube is connected to surface equipment consisting of a heat exchanger and a pump.

Although this Chinese invention relates to hot dry rock technology using a single well with multilaterals and producing heat in a closed loop, there are however differences with the present invention in the way the wells are completed. In this Chinese invention the vertical well is connected to the ground manifold through fully cased wellbores and to cased lateral branches through conversion joints. In the present invention, based on wellbores open to the geological formation, the lateral wells are sidetracked off the main well using retrievable whipstocks and multilateral circulation sealed bore junctions and hangers, all installed in the main wellbore and all equipped with circulation ports and open hole rock slips. The lateral heat absorbing wells are tied back in an open hole slotted tubing hanger which tied back to the surface via the annulus between the main wellbore and the common injection tubing. In the Chinese invention the laterals extend mostly in a long horizontal direction meanwhile in the present invention they extend downward from the main well. Another important difference relates to injection and production, in the Chinese invention the injection is only allowed in the fully cased annulus and production through tubing, in the present invention the inverse configuration can be envisaged. The spacing between laterals in the Chinese invention is between 350 and 400 meters, in the present invention it is 50 m.

2. CA2679905 Rogers, Williams et al. Relates to hot dry rock heat production technology in a closed loop circulation. The wellbore has an L-shaped form with a casing and a sealed bottom end. The cold fluid which is injected under pressure in the annulus will extract heat from the hot dry rock of the formation and enter the tubing through its open bottom end to return to the surface to be used for heating. Although this system is a simple well composed of only one lateral, there is, as in the present invention the possibility to inject cold fluid in the tubing and produce hot fluid from the annulus.
3. U.S. Pat. No. 8,020,382B1 Bohdan Zakiewicz et al. Relates to energy production from hot dry rock or formation with water using closed loop circulation. Heat recovery is accomplished using multilateral horizontal levels of generally radially drilled bores from a central shaft. Two ways heat is extracted from the environment either by heat transfer from the rock surrounding the horizontal wells or from heat transfer to conduits extending from the central shaft.
4. CN110360761A Han Chuanjun et al. Relates to tree-shaped dry-heat rock well structure and mining method. The well depth structure is divided into a vertical section, a deflecting section and an inclined branch section, wherein an inclined branch well is used for dividing a dry hot rock reservoir into different high-temperature heating zones so that a high-heat-recovery-rate geothermal development system can be realized; and a high-thermal-conductivity-coefficient production technology sleeve is applied under a well, so that the isolation between working medium water and the dry hot rock reservoir is realized, and the problems of damage to the dry hot rock reservoir, low permeability and the like due to a conventional fracturing mining method are solved. A water injection tube bundle is placed downwards and reaches all recharge layers in a vertical well, and meanwhile, a steam collection device is placed downwards and reaches the position above the dry hot rock reservoir so as to realize diversion and energy collection of high-temperature steam; and the high-temperature steam is liquefied after being utilized on the ground, and then the liquefied high-temperature steam can be re-conveyed to the position under the well through ground equipment.

BRIEF SUMMARY OF THE INVENTION

A plant for extracting geothermal energy from hot dry rock by circulating a working fluid through a single well 106 with several lateral heat absorbing branches 113. These branches are sidetracked off the main wellbore 111 and completed using a slotted lateral sealed bore junction and hanger assembly completion 114 installed in the main wellbore.

The heat absorbing branches are tied in and completed in a tubing mono assembly, comprising of the main wellbore 111 and lateral heat absorbing branches 113.

The lateral tubing assembly 115 is hung off in a slotted open-hole tubing hanger assembly 112 that is installed in the bottom section of the main wellbore 111. The hangers are equipped with circulation ports and open hole rock slips.

The heat extraction is done through direct contact between the circulating working fluid and the formation.

The main wellbore is to be drilled to Total Depth (TD) into the geological HDR formation. The wellbore will be open to formation except the upper part of the wellbore which will be cased off with a surface casing (108) for structural and thermal insulation purposes.

When the main well has reached TD the drilling and installation of the lateral wells will start, the number and length of which will depend upon the designed plant energy project deliveries.

DETAILED DESCRIPTION

A plant for exploiting geothermal energy by pumping and circulating working fluid through the center of preinstalled injection tubing installed in a drilled well down to the Earth surface.

Figure 1:
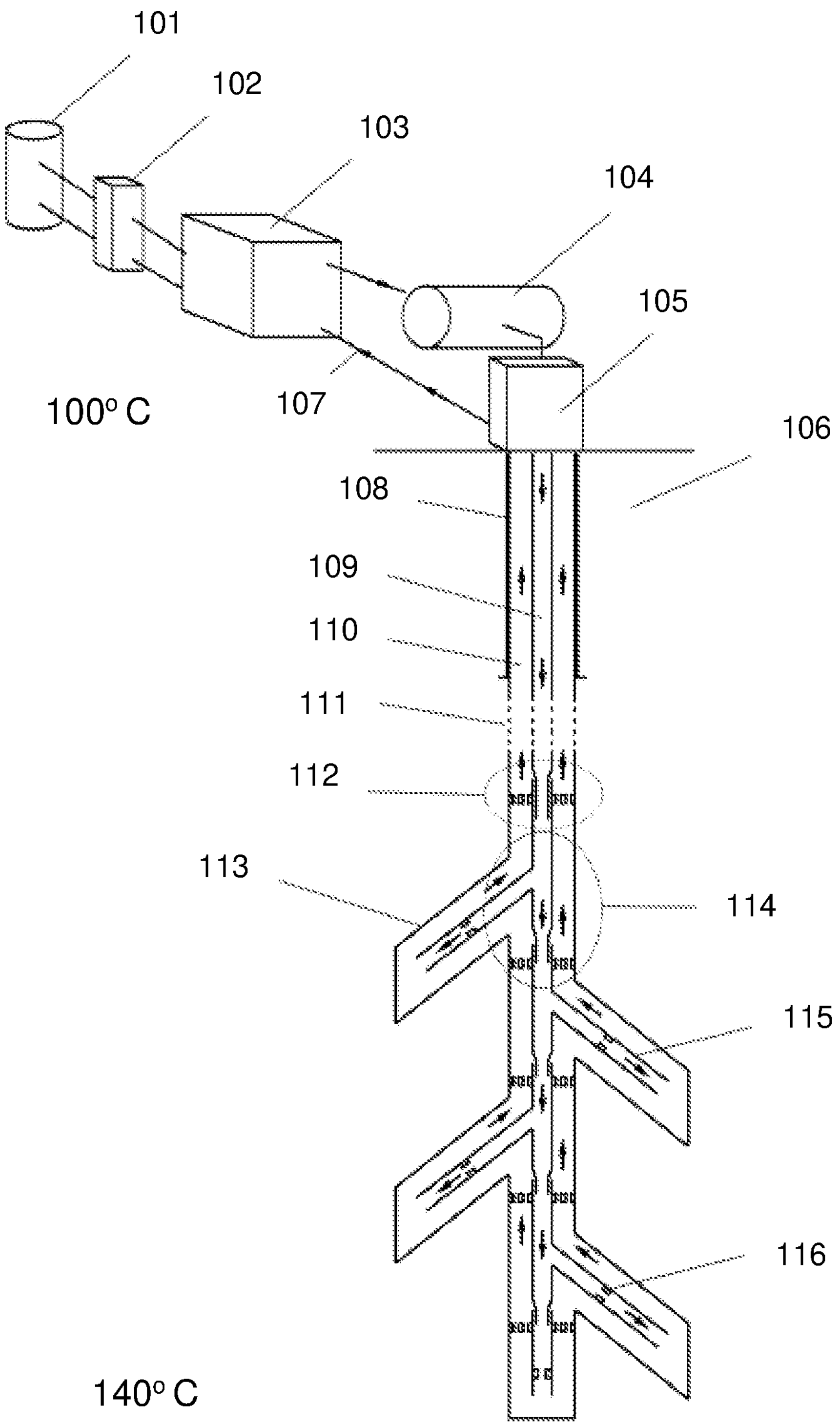
FIG. 1 gives a general schematic of the geothermal plant layout according to the invention.

As shown in FIG. 1, the plant will consist of a surface wellhead 105, heat exchanger 103, surface heat/energy consumers 101 and 102, a circulating/injection pump 104, surface fluid returns from well 107, the well 106 being drilled into said geological formation, the lower part of the well being drilled vertically or at an angle pending geological formation.

The lateral heat absorbing branches 113 are sidetracked off the main wellbore 111, using retrievable whipstocks and completed with slotted lateral sealed bore junction and hanger assembly completions 114 equipped with circulation ports and open hole rock slips.

The subsequent laterals and main wellbore will be equipped with lateral tubing assemblies 115, completed with downhole tubing circulating chokes 116 and designed for optimum and full circulation of the total injected volume of working fluid via the return annulus 110 between injection tubing 109 and main wellbore 111.

Eventually, all the lateral heat absorbing branches 113 are tied back in an slotted open-hole tubing hanger assembly 112, to be tied back to surface via the injection tubing 109, to be used for working fluid injection.

As working fluid is circulated from surface down the injection tubing 109 to the geological formation, through the lower section of the main wellbore 111, and through the lateral heat absorbing branches 113, the return annulus 110 between the installed injection tubing 109 will fill with working fluid in contact with the hot geological formation.

The continued injection of working fluid from the surface will ensure transportation of heated working fluid from the formation back to the surface via the tubing annuli of the lateral heat absorbing branches 113 and the return annulus 110 of the injection tubing 109.

The spacing and figuration between all the lateral heat absorbing branches 113 must be drilled at least 50 m away from the nearest heat absorbing branch.

The total length of the heat absorbing areas of the main wellbore 111, and particularly the lateral heat absorbing branches 113, will depend on the designed plant energy deliverables, as well as the optimization of geothermal contact and return of heated working fluid circulation.

All multilateral sealed bore circulation junction tubing hanger assemblies that are installed to be adequately slotted to ensure required annulus circulating area is available, not to restrict the design return circulation rate of volume of heated working fluid.

Figure 2:
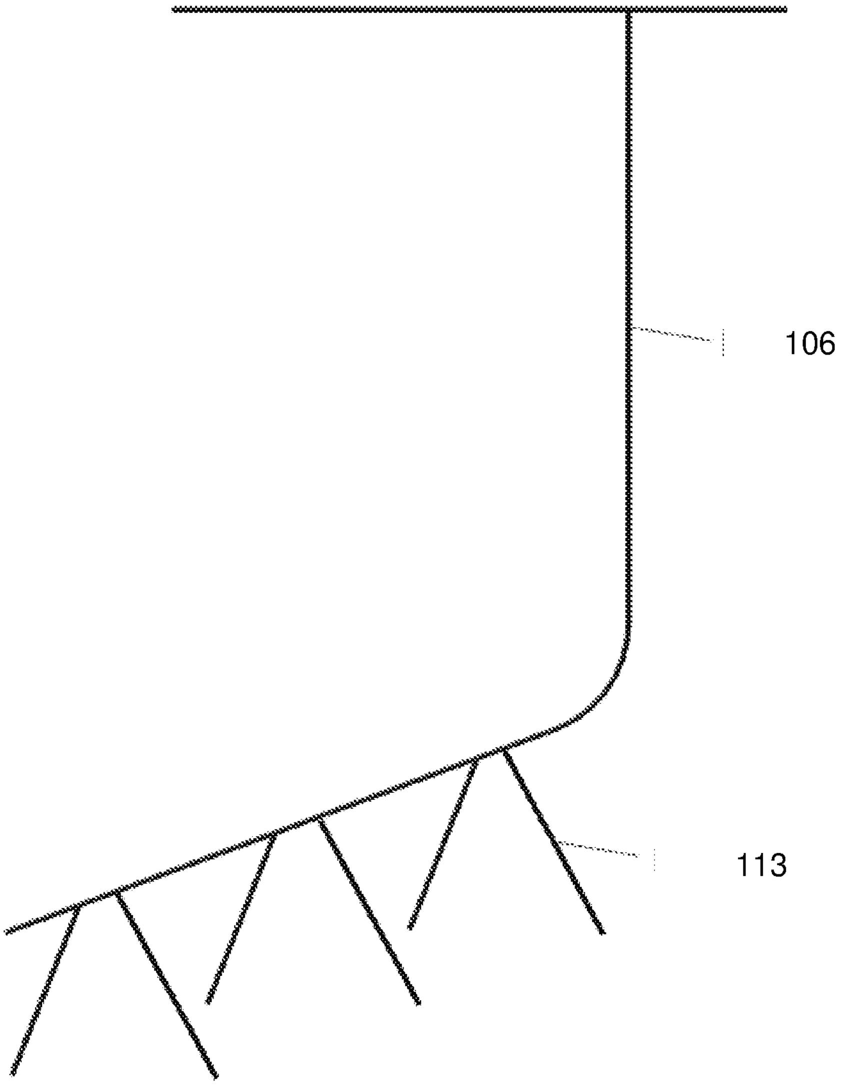
FIG. 2 is a schematic side view of the subsurface view of the plant and a typical well path, here shown with the lower main wellbore at an angle.

FIG. 2 shows the lower section of the wellbore 111 being drilled vertically, alternatively directionally drilled at an angle dependent on the geological formation, the subsequent lateral heat absorbing branches 113 being sidetracked off the main wellbore 111.

To avoid any bacteriological growth or contamination of the working fluid (water) circulated through the plant, the treatment of the fluid will depend on local conditions and requirements. The treatment will mainly be based on filtration of fluid and exposure to Ultraviolet (UV) light and the use of biocides.

| Terminology | |
|---|---|
| 101 | Surface heat/energy consumer |
| 102 | Surface heat/energy consumer |
| 103 | Heat exchanger |
| 104 | Injection/circulating pump |
| 105 | Surface wellhead |
| 106 | The well |
| 107 | Surface fluid returns from well |
| 108 | Surface casing |
| 109 | Injection tubing |
| 110 | Return annulus |
| 111 | Main wellbore |
| 112 | Slotted tubing hanger assembly |
| 113 | Lateral heat absorbing branches |
| 114 | Slotted lateral sealed bore junction and hanger assembly completion |
| 115 | Lateral tubing assembly |
| 116 | Downhole tubing circulating choke |

The invention claimed is:

1. A plant for extracting geothermal energy, comprising:

a surface wellhead and a main wellbore leading from the surface wellhead to a rock formation;

injection tubing installed in the main wellbore and a return annulus between the injection tubing and the main wellbore;

a plurality of lateral heat absorbing branches that are sidetracked off the main wellbore in a section of the plant and each completed using a slotted lateral sealed bore junction and hanger assembly completion installed in the main wellbore, wherein at least one hanger assembly completion of the hanger assembly completions is equipped with circulation ports and slips, and wherein the lateral heat absorbing branches are tied into the main wellbore;

wherein the lateral heat absorbing branches are tied back in a slotted open-hole tubing hanger assembly installed in a bottom section of the main wellbore, to be tied back to a surface via the injection tubing;

wherein the lateral heat absorbing branches and main wellbore are equipped with lateral tubing assemblies; and wherein the plant is configured so that heat extraction is performed through direct contact between a working fluid and the rock formation in the plurality of lateral heat absorbing branches, and wherein an upper part of the main wellbore is cased off by a surface casing to prevent inflow of external formation water into the return annulus.

2. The plant according to claim 1, wherein each lateral tubing assembly is connected to and extending from a corresponding slotted lateral sealed bore junction and hanger assembly completion.

3. The plant according to claim 2, further including a bottom hole assembly, wherein the bottom hole assembly is equipped with a guide and a downhole choke.

4. The plant according to claim 3, wherein each lateral heat absorbing branch is spatially distributed at least 50 m from its nearest heat absorbing branch.

5. The plant according to claim 2, wherein at least one lateral heat absorbing branch is spatially distributed at least 50 m from its nearest heat absorbing branch.

6. The plant according to claim 1, wherein an orientation and a direction of the lateral heat absorbing branches are adapted according to formation geology.

7. The plant according to claim 1, wherein parts of one or more of the lateral heat absorbing branches are located parallel to each other or extends downwards from the main wellbore.

8. The plant according to claim 1, wherein the surface wellhead has an inlet port for well injection through the injection tubing, and another port for circulating working fluid that has been heated in the return annulus.

9. The plant according to claim 1, wherein the plant is configured so that a flow direction in the injection tubing and the return annulus may be reversed to enable removal of sediments.

10. The plant according to claim 1, wherein the plant is configured so that the working fluid for extracting thermal energy from the rock formation is treated depending on local conditions and requirements to avoid bacterial growth, the treatment including filtration, exposure to Ultraviolet (UV) light and the use of biocides.

11. The plant according to claim 1, wherein the rock formation is a hot dry rock formation.

12. A method, comprising:

providing a plant for extracting geothermal energy, the plant including:

a surface wellhead and a main wellbore leading from the surface wellhead to a rock formation;

injection tubing installed in the main wellbore and a return annulus between the injection tubing and the main wellbore;

a plurality of lateral heat absorbing branches that are sidetracked off the main wellbore in a section of the plant and each completed using a slotted lateral sealed bore junction and hanger assembly completion installed in the main wellbore, wherein at least one hanger assembly completion of the hanger assembly completions is equipped with circulation ports and slips, and wherein the lateral heat absorbing branches are tied into the main wellbore;

wherein the lateral heat absorbing branches are tied back in a slotted open-hole tubing hanger assembly installed in a bottom section of the main wellbore, to be tied back to a surface via the injection tubing;

wherein the lateral heat absorbing branches and main wellbore are equipped with lateral tubing assemblies; and wherein the plant is configured so that heat extraction is performed through direct contact between a working fluid and the formation in the plurality of lateral heat absorbing branches, and wherein an upper part of the main wellbore is cased off by a surface casing to prevent inflow of external formation water into the return annulus; and extracting and producing geothermal energy from hot dry rock using the plant.

13. The method according to claim 12, wherein the rock formation is a hot dry rock formation.

* * * * *